Figure 1:
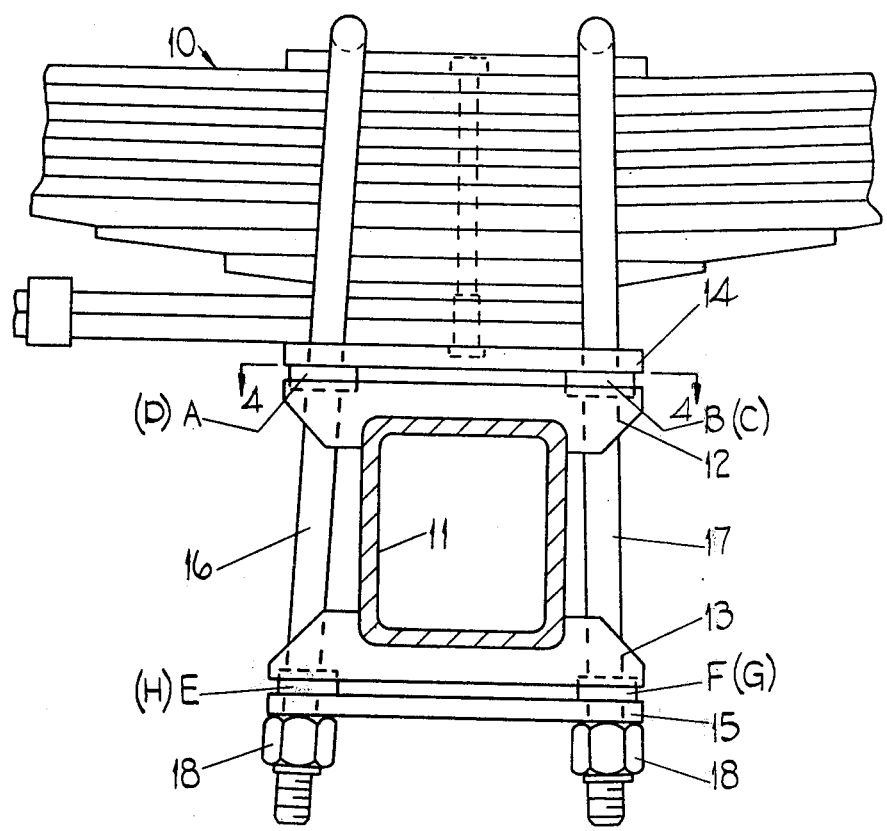

United States Patent
Seilly et al.

[11] 3,935,915
[45] Feb. 3, 1976

[54] WEIGHING DEVICE

[76] Inventors: Alec Harry Seilly, North Wembley; Kenneth Clive Scott, London, both of England

[73] Assignee: Simms Group Research & Development Limited, London England

[22] Filed: Feb. 28, 1974

[21] Appl. No.: 446,679

[30] Foreign Application Priority Data
Mar. 13, 1973 United Kingdom............... 12048/73

[52] U.S. Cl. .................. 177/136; 177/211; 267/52
[51] Int. Cl.² ........................................ G01G 19/12
[58] Field of Search ...... 267/52; 177/136, 137, 210, 177/211

[56] References Cited
UNITED STATES PATENTS

| | | | |
|---|---|---|---|
| 3,241,626 | 3/1966 | Woodburn.......................... | 177/137 |
| 3,724,571 | 3/1973 | Thorn et al........................ | 177/137 |
| 3,743,041 | 6/1973 | Videon............................... | 173/137 |

Primary Examiner—James B. Marbert
Attorney, Agent, or Firm—Kane, Dalsimer, Kane, Sullivan and Kurucz

[57] ABSTRACT

A wheeled vehicle includes a wheel carrying axle upon which the weight of the vehicle and its load is carried through the intermediary of a spring. The spring is coupled to the axle by means of a mounting unit which includes a pair of spaced mounting plates and also a pair of spaced supporting plates which are disposed in spaced relationship relative to the mounting plates. Interposed between the support plates and mounting plates are sensing elements and the support plates and mounting plates are clamped together by means of bolts. The upper sensing elements are subjected to the clamping force together with the weight of the vehicle and its load, whilst the lower sensing elements are only subjected to the clamping force. The sensing elements are connected into a bridge circuit.

15 Claims, 8 Drawing Figures

WEIGHING DEVICE

This invention relates to a wheeled vehicle of the kind including a wheel carrying axle, the load carrying portion of the vehicle being carried by resilient or non-resilient supports which are clamped to the axle and there being interposed between the supports and the axle, force sensing elements operable to provide an electrical signal indicative of the load transmitted to the axle by the supports.

With the above arrangement, each element is subjected to the force arising due to the weight of the load carrying portion of the vehicle and its load, as well as the clamping force required to clamp the support to the axle. This latter force is substantial, and as a result the sensitivity of the sensing element to variations in the load carried by the load carrying portion of the vehicle is reduced.

The object of the invention is to provide a wheeled vehicle of the kind specified in a simple and convenient form.

According to the invention, in a vehicle of the kind specified there is provided in association with each support, a further force sensing element which is positioned so as to be subjected only to the clamping force clamping the support to the axle, the first mentioned element and the further element being electrically connected so that the resultant signal is dependent only upon the force transmitted to the axle by the support.

Figure 2:
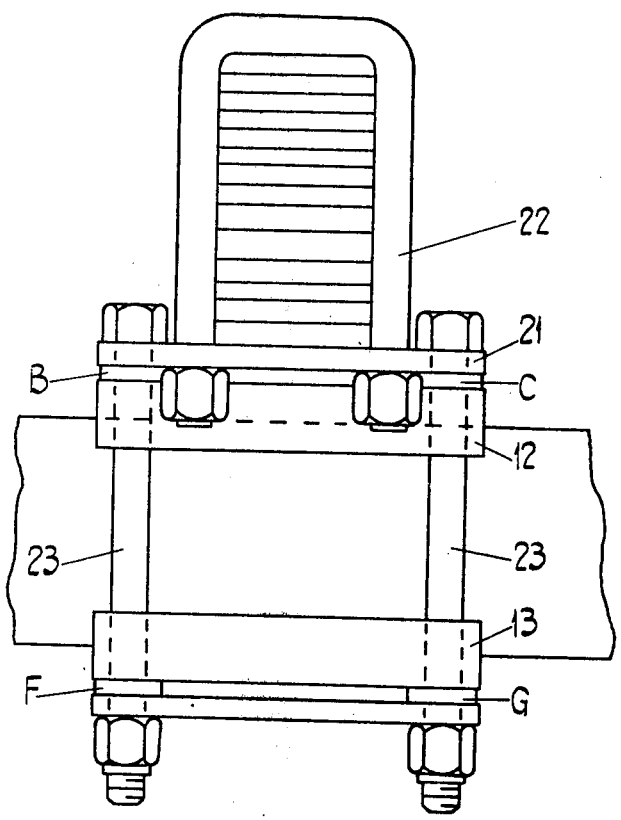
Figure 3:
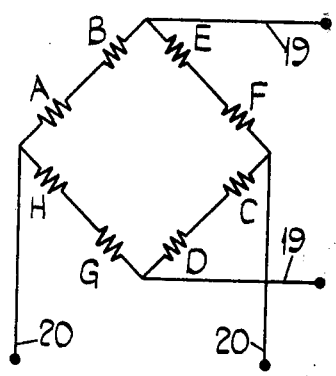
Figure 4:
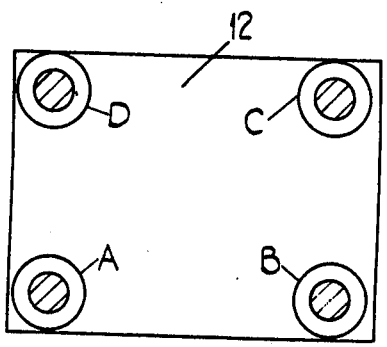

Examples of wheeled vehicles in accordance with the invention will now be described with reference to the accompanying drawings which show a portion only of the vehicle, and in which;

FIG. 1 is a sectional side elevation taken through the vehicle axle of one example, FIG. 2 shows a modification of the example shown in FIG. 2, the view being taken at right angles to that of FIG. 1, FIG. 3 shows an electrical circuit diagram, FIG. 4 is a plan view taken on the line 4—4 of FIG. 1, and FIGS. 5–8 inclusive are views similar to FIG. 1 showing modifications.

Referring to FIG. 1 of the drawings, there is provided a multi-leaf vehicle spring 10 of conventional construction, and in addition an axle 11 having a hollow rectangular section. Upper and lower mounting plates 12, 13 are provided for engagement with the axle, and these are recessed in known manner to locate upon the axle. Also provided are substantially flat spacing plates 14, 15.

There is additionally provided a pair of U bolts 16, 17 the limbs of which extend through suitably positioned apertures in the spacing plates and mounting plates. The U bolts extend over the spring 10 and the free ends thereof are threaded and receive clamping nuts 18. Surrounding the limbs of the U bolts and interposed between the spacing plates and the mounting plates are sensing elements which are of annular form. The elements are referenced A, B, C, D, E, F, G and H. Each sensing element is provided with a resistive element, and the resistive elements are connected as seen in FIG. 3, in a bridge circuit. The resistive elements of the sensing elements between the spacing plate 14 and the mounting plate 12 and which are subjected to the load carried by the vehicle, the weight of the vehicle and the clamping force on the spring 10 are connected in opposite arms of the bridge circuit to the resistive elements of the sensing elements which are disposed between the spacing plate 15 and the mounting plate 13, the latter sensing elements only being subjected to the clamping force of the spring. As is the usual practice, the bridge circuit has a pair of electrical input terminals 19 which in use, are connected to a source of electric supply not shown and a pair of output terminals 20, which in use, are connected to an indicating instrument.

In the arrangement which is shown in FIG. 2, the U bolts 22 extend only so far as the upper spacer plate 21, and the latter together with the mounting plates and the lower spacer plate are connected by means of conventional bolts 23. In this arrangement therefore, the clamping force required to clamp the spring is not sensed by any one of the sensing elements. Nevertheless, the same arrangement of sensing element is used as in the example of FIG. 1 since it is obviously necessary to create a clamping force using the bolts 23 to secure the spring to the axle. The resistive elements of the sensing elements are connected in a bridge circuit in the same manner as with the example of FIG. 1.

Figure 5:
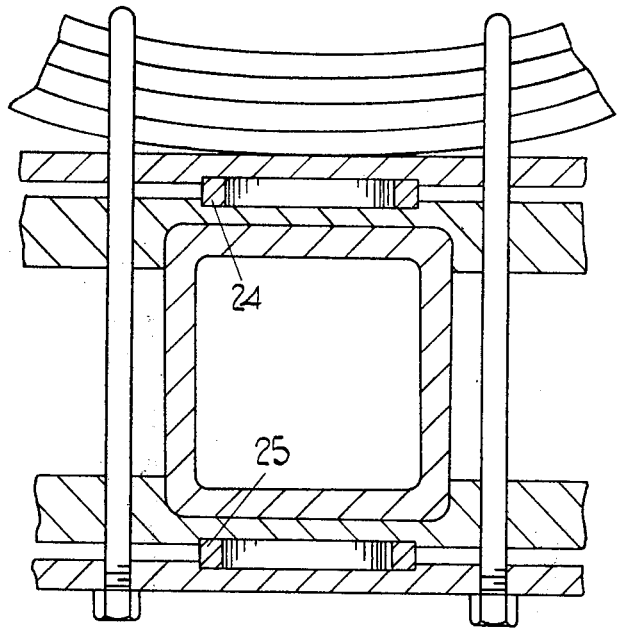

Referring now to FIG. 5, the basic construction is identical to that of FIG. 1 with the exception that the sensing elements are now replaced by a pair of sensing rings 24, 25, these being disposed within annular recesses formed in the adjacent faces of the upper spacing plate and upper mounting plate and the lower spacing plate and the lower mounting plate. The sensing rings 24, 25 are provided with a plurality of resistive elements which are connected in a bridge circuit.

Figure 6:
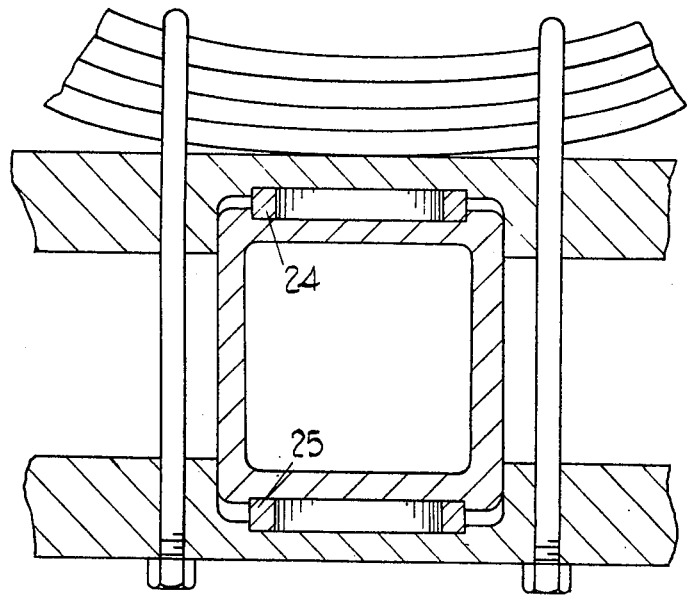

The arrangement shown in FIG. 6 eliminates the spacing plates and in this example, the sensing rings 24, 25 are disposed between the mounting plates and the axle. Annular recesses are formed in the axis to partially locate the sensing rings.

Figure 7:
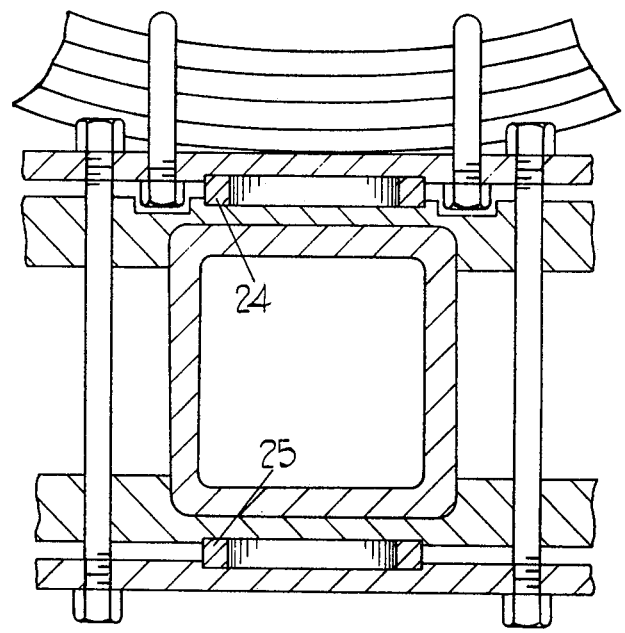

The arrangement shown in FIG. 7 is a modification of the arrangement shown in FIG. 5 and employs the same technique as the example shown in FIG. 2. That is to say that the clamping force required to clamp the spring is not applied through the sensing rings.

Figure 8:
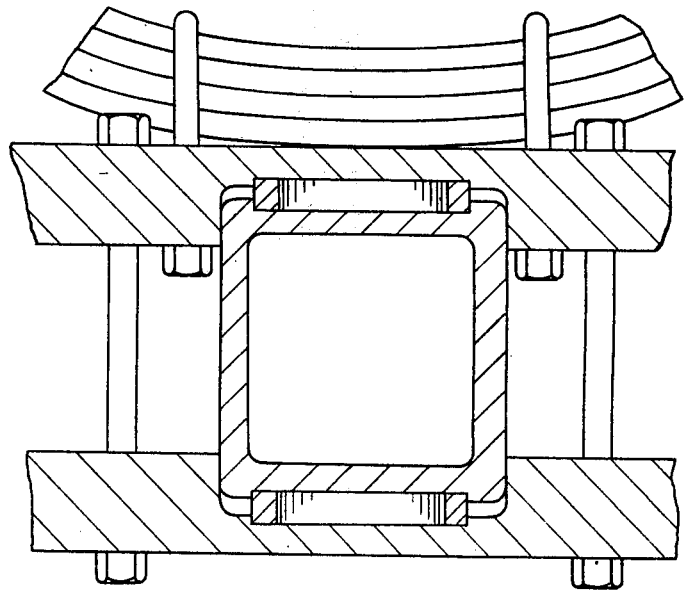

The arrangement shown in FIG. 8 is similar to the arrangement shown in FIG. 6, but again in this example, the same technique as that used in the example of FIG. 2 is applied.

We claim:

1. A wheeled vehicle of the kind including a wheel carrying axle, the load carrying portion of the vehicle being carried by supports which are clamped to the axle and there being interposed between the supports and the axle, annular force sensing elements operable to provide an electrical signal indicative of the load transmitted to the axle by the supports including the clamping force clamping the support to the axle, the vehicle including in association with each support a further annular force sensing element which is positioned so as to be subjected only to the clamping force clamping the support to the axle, the first mentioned element and the further element being electrically connected so that the resultant signal is independent of the clamping force and is dependent only upon the force transmitted to the axle by the support with the clamping force having been cancelled out electrically.

2. A vehicle as claimed in claim 1 in which each support includes a pair of mounting plates which are disposed above and below the axle, said mounting plates being shaped to engage and locate on the axle, a pair of spacer plates disposed adjacent the mounting plates respectively, said force sensing elements being disposed between the spacer plates and mounting plates, and means clamping the spacer plates and mounting plates together to secure the mounting plates on the axle, said sensing elements being subjected to the clamping force, one of the sensing elements also being subjected to part of the weight of the load carried by the vehicle and to part of the weight of the vehicle.

3. A vehicle as claimed in claim 2 in which the clamping of the plates is achieved by bolts extending through apertures in the plates.

4. A vehicle as claimed in claim 3 in which said sensing elements are of annular form and one such element surrounds each bolt.

5. A vehicle as claimed in claim 4 in which a leaf spring forming part of the vehicle suspension system is clamped to the upper spacer plate.

6. A vehicle as claimed in claim 5 in which said bolts are extended over the spring in order to clamp the spring to the upper spacer plate.

7. A vehicle as claimed in claim 5 in which additional bolts are provided to clamp the spring to the upper spacer plate.

8. A vehicle as claimed in claim 3 in which said sensing elements are of annular form and are located within recesses defined in the adjacent faces of the mounting plates and support plates.

9. A vehicle as claimed in claim 8 in which a leaf spring forming part of the vehicle suspension system is clamped to the upper spacer plate.

10. A vehicle as claimed in claim 9 in which said bolts are extended over the spring in order to clamp the spring to the upper spacer plate.

11. A vehicle as claimed in claim 9 in which additional bolts are provided to clamp the spring to the upper spacer plate.

12. A vehicle as claimed in claim 1 in which each support includes a pair of mounting plates which are disposed above and below the axle, said mounting plates being shaped to engage and locate on the axle, the upper and lower faces of the axle and the adjacent faces of the mounting plates defining recesses in which are disposed sensing elements respectively and means clamping the mounting plates together to secure the mounting plates to the axle, said sensing elements being subjected to the clamping force, one of said sensing elements also being subjected to part of the weight of the load carried by the vehicle and to part of the weight of the vehicle.

13. A vehicle as claimed in claim 12 in which the clamping of the plates is achieved by bolts which extend through apertures in the plates.

14. A vehicle as claimed in claim 13 in which said bolts are extended around a spring forming part of the vehicle suspension system.

15. A vehicle as claimed in claim 13 including additional bolts which serve to clamp the upper mounting plate to a spring forming part of the vehicle suspension system.

* * * * *